July 8, 1958    E. T. CARROLL    2,841,811
FINGER CLEANING DEVICE
Filed April 9, 1956
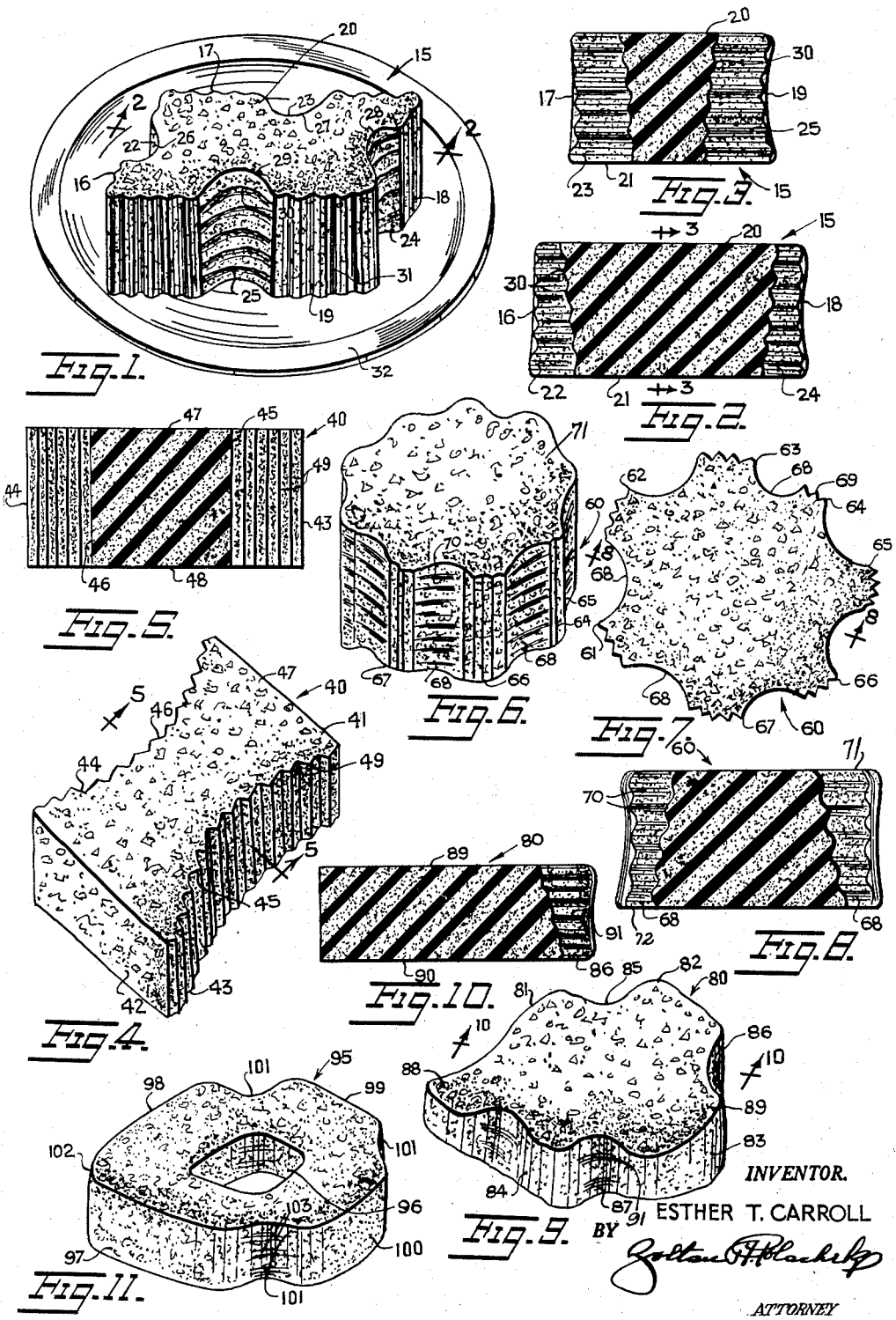
INVENTOR.
ESTHER T. CARROLL
BY
ATTORNEY

United States Patent Office 2,841,811
Patented July 8, 1958

2,841,811
FINGER CLEANING DEVICE

Esther T. Carroll, Jamaica, N. Y.

Application April 9, 1956, Serial No. 576,865

3 Claims. (Cl. 15—244)

This invention relates to new and useful improvements in finger cleaning devices.

More particularly, the present invention proposes the construction of an improved finger cleaning device which can be used easily, quickly and conveniently to cleanse one's fingers while or after eating foods that require finger handling such as fried chicken, spareribs, corn on the cob, muffins, candy, nuts and the like.

As a further object, the present invention proposes forming the finger cleaning device with a plurality of concave portions shaped to fit fingers and finger tips so that they may be wiped clean after any use in which they have become soiled or otherwise in need of cleaning.

Still further, the present invention proposes constructing the device with an absorbent, resilient member, such as a sponge or the like, which can be placed on a saucer or dish and moistened with water for serving and using in place of a finger bowl.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a finger cleaning device constructed and arranged in accordance with the present invention.

Fig. 2 is a sectional view taken on line 2—2 of Fig. 1, the dish being omitted.

Fig. 3 is a sectional view taken on line 3—3 of Fig. 2.

Fig. 4 is a view similar to Fig. 1 but illustrating a modification of the present invention.

Fig. 5 is a sectional view taken on line 5—5 of Fig. 4.

Fig. 6 is a view similar to Fig. 4 but illustrating another modification of the invention.

Fig. 7 is a top plan view of the structure shown in Fig. 6.

Fig. 8 is a sectional view taken on line 8—8 of Fig. 7.

Fig. 9 is a view similar to Figs. 1, 4 and 6 but illustrating a third modification.

Fig. 10 is a sectional view taken on line 10—10 of Fig. 9.

Fig. 11 is a view similar to Fig. 9 but illustrating still another modification.

Referring more particularly to the drawings, the finger cleaning device in accordance with the first form of the invention illustrated in Figs. 1, 2 and 3, is a block of resilient absorbent material such as sponge rubber or the like and designated generally by the reference numeral 15.

Block 15 has sides 16, 17, 18 and 19 and top and bottom surfaces 20 and 21. The block 15 is of a thickness such that sides 16, 17, 18 and 19 are at least of finger tip depth and may be substantially deeper.

Spaced finger wiping concave portions 22, 23, 24 and 25 are provided in the sides 16, 17, 18 and 19, respectively. The concave portions 22, 23, 24 and 25 are identically shaped and constructed, each being adapted to receive and clean a person's fingers and finger tips.

Concave portions 22, 23, 24 and 25 extend between the top and bottom surfaces 20 and 21, respectively, and are tapered from bottom to top. Finger recesses 26, 27, 28 and 29 are provided in the top surface 20 (and also in bottom surface 21 but not shown) which connect with the concave portions.

Concave portions 22, 23, 24 and 25 have laterally disposed cross serrations 30 and sides 16, 17, 18 and 19 have vertically disposed serrations 31 adjacent the concave portions. The serrations give the surface of the sponge a rough texture which aids in cleaning the fingers. The serrations running in different directions also enhance the decorativeness of the design.

The block 15 may rest in a dish or saucer 32 and can be made of natural-sea sponge, rubber sponge, all synthetic sponge and other sponge-like material in various colors, designs and shapes. The block is moistened before use. It is used in place of a finger bowl, the fingers being dried on a napkin after they have been cleaned by wiping them on the block concave portions or squeezing the block by such portions. The block can easily be cleaned after use and is particularly useful in card games to keep the cards free of finger soil where nuts and other foods or drinks are served.

The modification of the invention illustrated in Figs. 4 and 5 is characterized by the provision of an absorbent resilient block 40 having straight opposed sides 41 and 42 and sides 43 and 44 which contain concave portions 45 and 46. Block 40 also has an upper or top surface 47 and a lower or bottom surface 48. The sides 43 and 44 contain vertical serrations 49.

The modification of the invention illustrated in Figs. 6, 7 and 8 is characterized by the provision of a resilient absorbent block 60 having sides 61, 62, 63, 64, 65, 66, 67 and concave portions 68. The sides have vertical serrations 69 and the concave portions lateral serrations 70. Top and bottom surfaces 71 and 72, respectively, are also provided. The concave portions are tapered from top to bottom.

The modification of the invention illustrated in Figs. 9 and 10 is characterized by the provision of a resilient absorbent block 80 having sides 81, 82, 83 and 84 and concave portions 85, 86 and 87. Block 80 also has a handle portion 88 and top and bottom surfaces 89 and 90. The concave portions 85, 86 and 87 have lateral serrations 91. The concave portions taper from top to bottom.

The modification of the invention illustrated in Fig. 11 is characterized by the provision of a block 95 of resilient material having a center finger hole or opening 96 and sides 97, 98, 99 and 100 with concave portions 101 and a handle portion 102. The concave portions 101 have lateral serrations 103. The concave portions taper from bottom to top.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A finger cleaning device comprising an absorbent block having sides, said sides having a plurality of spaced finger wiping concave portions of a size to receive a person's finger, said concave portions having laterally disposed cross serrations, said absorbent block having top and bottom surfaces and said concave portions of said sides extending between said top and bottom surfaces.

2. A finger cleaning device comprising an absorbent block having sides, said sides having a plurality of spaced finger wiping concave portions of a size to receive a person's finger, said concave portions having laterally disposed cross serrations, said absorbent block having top and bottom surfaces and said concave portions of said sides extending between said top and bottom surfaces, said concave portions being tapered from bottom to top providing finger recesses in the top and bottom edges of the block.

3. A finger cleaning device comprising an absorbent block having sides, said sides having a plurality of spaced finger wiping concave portions of a size to receive a person's finger, said concave portions having laterally disposed cross serrations, said absorbent block having top and bottom surfaces and said concave portions of said sides extending between said top and bottom surfaces, said concave portions being tapered from bottom to top providing finger recesses in the top and bottom edges of the block, said sides having vertically disposed serrations adjacent the concave portions.

References Cited in the file of this patent

UNITED STATES PATENTS

| | | |
|---|---|---|
| 2,030,911 | Borden | Feb. 18, 1936 |
| 2,146,455 | Tepper | Feb. 7, 1939 |
| 2,204,203 | Zimmerman | June 11, 1940 |
| 2,319,873 | Linz | May 25, 1943 |
| 2,341,818 | Schellings | Feb. 15, 1944 |
| 2,620,502 | Russak | Dec. 9, 1952 |
| 2,628,381 | Scaff | Feb. 17, 1953 |
| 2,632,906 | Friedman | Mar. 31, 1953 |
| 2,755,497 | Greacen | July 24, 1956 |

FOREIGN PATENTS

| | | |
|---|---|---|
| 107,279 | Sweden | Apr. 27, 1943 |
| 838,491 | Germany | May 8, 1952 |